(12) United States Patent
Meyer et al.

(10) Patent No.: US 7,579,840 B2
(45) Date of Patent: Aug. 25, 2009

(54) BROADBAND RESISTIVITY INTERPRETATION

(75) Inventors: Wallace H. Meyer, Spring, TX (US); David C. Herrick, Cody, WY (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/528,828

(22) Filed: Sep. 28, 2006

(65) Prior Publication Data
US 2008/0079432 A1    Apr. 3, 2008

(51) Int. Cl.
G01V 3/00    (2006.01)
G01V 3/10    (2006.01)

(52) U.S. Cl. .................................. 324/338; 324/341

(58) Field of Classification Search ................. 324/341, 324/323, 324, 325, 332, 334, 335, 336, 338, 324/339–346, 355–356, 369; 73/152.01, 73/152.02, 152.03, 152.05; 702/6, 7, 11
See application file for complete search history.

(56) References Cited

U.S. PATENT DOCUMENTS

| | | | |
|---|---|---|---|
| 4,052,662 A | 10/1977 | Rau | |
| 4,626,773 A * | 12/1986 | Kroeger et al. | 324/642 |
| 5,475,309 A | 12/1995 | Hong et al. | |
| 5,811,973 A | 9/1998 | Meyer, Jr. | 324/338 |
| 6,150,822 A | 11/2000 | Hong et al. | |
| 7,228,903 B2 * | 6/2007 | Wang et al. | 166/254.2 |

OTHER PUBLICATIONS

D.C. Herrick et al.; "Electrical Efficiency: A Pore Geometric Model for the Electrical Properties of Rocks", SPWLA 34th Annual Logging Symposium, Paper HH, Jun. 13-16, 1993, pp. 1-20.

W. H. Meyer; "Field Measurements of Resistivity Dispersion Using Two Frequency MWD Propagation Resistivity Tools", Petrophysics, vol. 41, No. 6, Nov.-Dec. 2000, pp. 492-502.

S.M. Haugland; "Frequency Dispersion Effects on LWD Propagation Resistivity Measurements", SPE 96596, 2005 SPE Annual Technical Conference and Exhibition, Dallas, TX, Oct. 9-12, 2005, pp. 1-14.

* cited by examiner

*Primary Examiner*—Reena Aurora
(74) *Attorney, Agent, or Firm*—Madan & Sriram, P.C.

(57) ABSTRACT

Resistivity measurements are made at a plurality of frequencies. An asymptotic high-frequency limit is determined and the electrical efficiency is estimated as a ratio of the high frequency resistivity limit to the low frequency resistivity. From the electrical efficiency, petrophysical parameters of a rock such as porosity and water saturation can be estimated.

20 Claims, 9 Drawing Sheets

CONDUCTIVITY = $C_W$

CONDUCTIVITY = $C_W \phi$

CONDUCTIVITY = $C_w$

CONDUCTIVITY = $C_w \phi$

CONDUCTIVITY = $C_w \phi \dfrac{1}{\tau^2}$

CONDUCTIVITY = $C_w \phi E_0$

BROADBAND RESISTIVITY INTERPRETATION

FIELD OF THE INVENTION

The present invention relates to a method of determining formation petrophysical properties using measurements made by a propagation resistivity tool at multiple frequencies.

DESCRIPTION OF THE RELATED ART

This invention relates to the measurement of geophysical parameters of earth formations penetrated by a borehole and more particularly to propagation resistivity measurements at multiple frequencies and at multiple transmitter-receiver spacings. Measurements are made by using one or more transmitters which induce an alternating voltage into the borehole and the earth formation penetrated by the borehole, and by using one or more longitudinally-spaced receivers to detect the amplitude and phase of electromagnetic radiation induced within the borehole and earth formation. The measured responses are affected by properties of the earth formation including electrical conductivity, magnetic permeability, dielectric permeability and the pore volume or porosity of the rock matrix. In addition, the borehole environs also affect the measurements. This invention sets forth apparatus and methods for determining the formation water saturation. In addition, the frequency-dependent (dispersion) characteristics of the earth formation are affected by the distribution of fluids in the pore spaces of the rock. The same distribution of pore-spaces also affects the permeability of the formation. By combining the measurements yielded by the present invention with other borehole devices, it is possible to infer a variety of petrophysical parameters of the earth formation, Induction techniques have been used for a number of years to determine the resistivity and other electromagnetic parameters of earth formations penetrated by a borehole. Historically, formation resistivity has been the primary parameter of interest since it is used to delineate hydrocarbons from saline waters. Conceptually, an alternating current is applied to a transmitter of a borehole instrument thereby generating a primary electromagnetic field in the earth formation in the vicinity of the transmitter. The primary field interacts with the earth formation thereby setting up a secondary field with the amplitude and phase of this secondary field being related to electromagnetic properties of the formation. Fluids in the borehole and the invasion of these fluids into the formation can adversely affect the measure of electromagnetic properties of the undisturbed or virgin formation. Multiple receivers located at different longitudinal spacings from the transmitter are employed to measure the secondary field.

U.S. Pat. No. 5,811,973 to Meyer Jr., having the same assignee as the present invention and the contents of which are incorporated herein by reference, shows an example of the frequency dependence of resistivity measured by a dual propagation resistivity device. The analysis of the data therein used a complex refractive index (CRIM) model to infer certain petrophysical parameters of the formation. The present invention is based on the recognition that the assumptions of the CRIM model may not be satisfied. Accordingly, a model based on first principles is used to infer a wide range of properties of the formation.

SUMMARY OF THE INVENTION

One embodiment of the invention is a method of evaluating an earth formation. The method includes making measurements indicative of a resistivity property of the earth formation at each of a plurality of frequencies, estimating from the plurality of measurements a value of the resistivity property at a frequency greater than about 10 GHz, and using the estimated value of the resistivity property for estimating a petrophysical property related to rock pores and a fluid distribution therein. The estimated petrophysical property may be a porosity of the earth formation or may be a fluid saturation of the earth formation. Estimating the value of the resistivity property at a frequency greater than about 10 GHz may be done using a curve fitting. The curve fitting may be a sigmoidal curve fitting. The estimation of the petrophysical property may be based on estimating an electrical efficiency of the formation. The petrophysical property may be estimated using an empirical relation between the petrophysical property and the electrical efficiency. The measurements indicative of the resistivity property may be made using a propagation resistivity tool in a borehole in the earth formation. The propagation resistivity tool may be conveyed into the borehole on a bottomhole assembly using a drilling tubular.

Another embodiment of the invention is an apparatus for evaluating an earth formation. The apparatus includes a resistivity logging tool configured to make measurements indicative of a resistivity property of the earth formation at each of a plurality of frequencies. The apparatus also includes a processor configured to estimate from the plurality of measurements a value of the resistivity property at a frequency greater than about 10 GHz, and use the estimated value of the resistivity property for estimating a petrophysical property related to rock pores and a fluid distribution therein. The estimated petrophysical property may include porosity and/or a fluid saturation. The processor may further be configured to estimate the petrophysical property by estimating an electrical efficiency of the formation. The processor may use an empirical relation between the petrophysical property and the electrical efficiency. The resistivity tool may be a propagation resistivity tool. The apparatus may also include a drilling tubular configured to convey the resistivity logging tool on a bottomhole assembly.

Another embodiment of the invention is a computer-readable medium for use with an apparatus for evaluating an earth formation. The apparatus includes a resistivity logging tool configured to make measurements indicative of a resistivity property of the earth formation at a plurality of frequencies. The medium includes instructions which enable a processor to estimate, from the plurality of measurements, a value of the resistivity property at a frequency greater than about 10 GHz, and use the estimated value of the resistivity property for estimating a petrophysical property of the earth formation. The computer-readable medium may include a ROM, an EPROM, an EAROM, a flash memory, and/or an optical disk.

BRIEF DESCRIPTION OF THE DRAWINGS

The present invention is best understood with reference to the accompanying figures in which like numerals refer to like elements, and in which.

DETAILED DESCRIPTION OF THE INVENTION

Figure 1:
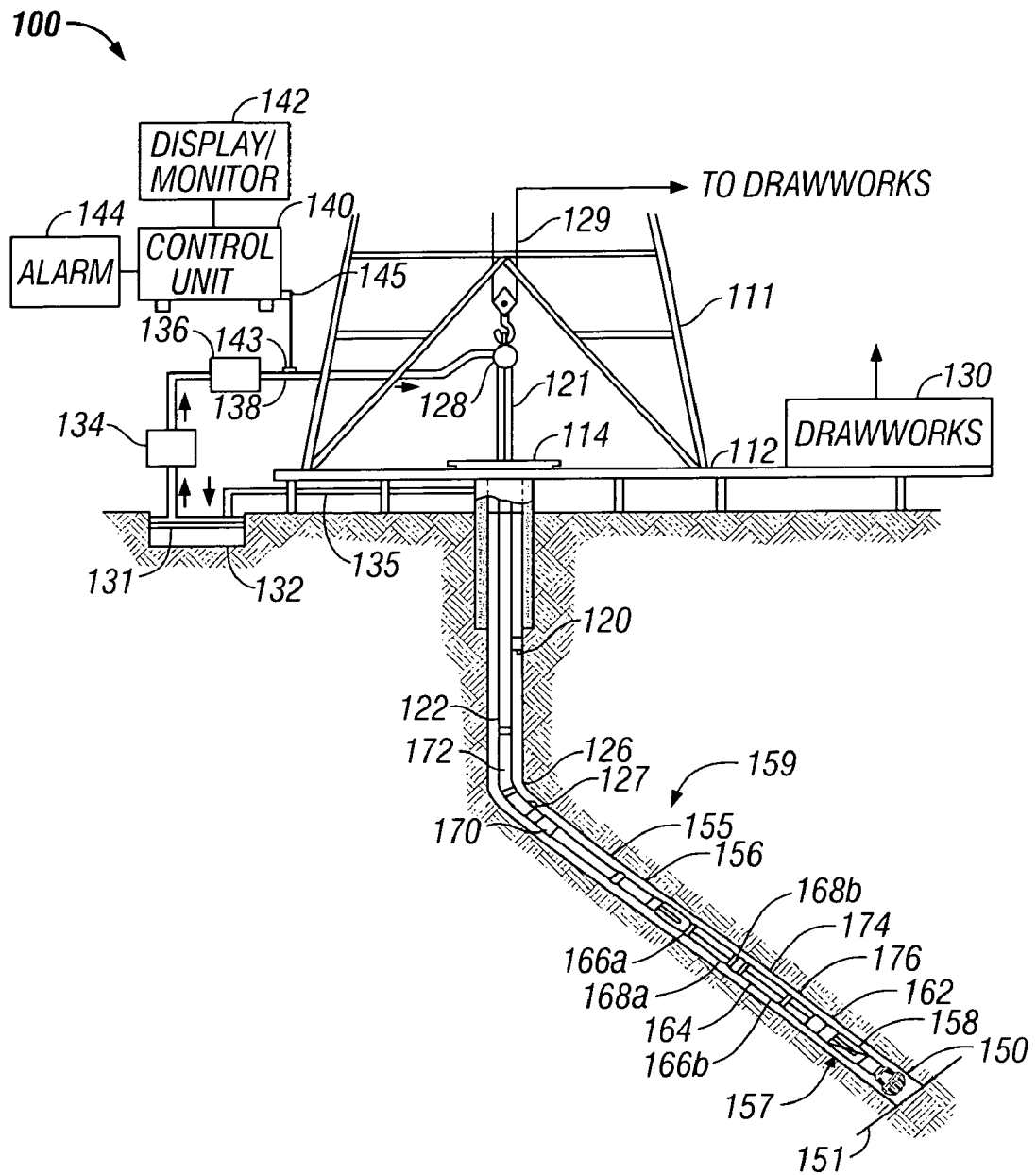
FIG. 1 (Prior Art) shows a logging-while-drilling system suitable for use with the present invention.

FIG. 1 shows a schematic diagram of a drilling system 110 having a downhole assembly containing a sensor system and the surface devices according to one embodiment of present invention. As shown, the system 110 includes a conventional derrick 111 erected on a derrick floor 112 which supports a rotary table 114 that is rotated by a prime mover (not shown) at a desired rotational speed. A drill string 120 that includes a drill pipe section 122 extends downward from the rotary table 114 into a borehole 126. A drill bit 150 attached to the drill string downhole end disintegrates the geological formations when it is rotated. The drill string 120 is coupled to a drawworks 130 via a kelly joint 121, swivel 118 and line 129 through a system of pulleys 127. During the drilling operations, the drawworks 130 is operated to control the weight on bit and the rate of penetration of the drill string 120 into the borehole 126. The operation of the drawworks is well known in the art and is thus not described in detail herein.

During drilling operations a suitable drilling fluid (commonly referred to in the art as "mud") 131 from a mud pit 132 is circulated under pressure through the drill string 120 by a mud pump 134. The drilling fluid 131 passes from the mud pump 134 into the drill string 120 via a desurger 136, fluid line 138 and the kelly joint 121. The drilling fluid is discharged at the borehole bottom 151 through an opening in the drill bit 150. The drilling fluid circulates uphole through the annular space 127 between the drill string 120 and the borehole 126 and is discharged into the mud pit 132 via a return line 135. Preferably, a variety of sensors (not shown) are appropriately deployed on the surface according to known methods in the art to provide information about various drilling-related parameters, such as fluid flow rate, weight on bit, hook load, etc.

A surface control unit 140 receives signals from the downhole sensors and devices via a sensor 143 placed in the fluid line 138 and processes such signals according to programmed instructions provided to the surface control unit. The surface control unit displays desired drilling parameters and other information on a display/monitor 142 which information is utilized by an operator to control the drilling operations. The surface control unit 140 contains a computer, memory for storing data, data recorder and other peripherals. The surface control unit 140 also includes models and processes data according to programmed instructions and responds to user commands entered through a suitable means, such as a keyboard. The control unit 140 is preferably adapted to activate alarms 144 when certain unsafe or undesirable operating conditions occur.

A drill motor or mud motor 155 coupled to the drill bit 150 via a drive shaft (not shown) disposed in a bearing assembly 157 rotates the drill bit 150 when the drilling fluid 131 is passed through the mud motor 155 under pressure. The bearing assembly 157 supports the radial and axial forces of the drill bit, the downthrust of the drill motor and the reactive upward loading from the applied weight on bit. A stabilizer 158 coupled to the bearing assembly 157 acts as a centralizer for the lowermost portion of the mud motor assembly. The use of a motor is for illustrative purposes and is not a limitation to the scope of the invention.

In one embodiment of the system of present invention, the downhole subassembly 159 (also referred to as the bottomhole assembly or "BHA") which contains the various sensors and MWD devices to provide information about the formation and downhole drilling parameters and the mud motor, is coupled between the drill bit 150 and the drill pipe 122. The downhole assembly 159 preferably is modular in construction, in that the various devices are interconnected sections so that the individual sections may be replaced when desired.

Still referring to FIG. 1, the BHA also preferably contains sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 164 may be coupled above the lower kick-off subassembly 162 that provides signals, from which resistivity of the formation near the drill bit 150 is determined. A multiple propagation resistivity device ("MPR") having one or more pairs of transmitting antennae 166a and 166b spaced from one or more pairs of receiving antennae 168a and 168b is used. Magnetic dipoles are employed which operate in the medium frequency and lower high frequency spectrum. In operation, the transmitted electromagnetic waves are perturbed as they propagate through the formation surrounding the resistivity device 164. The receiving antennae 168a and 168b detect the perturbed waves. Formation resistivity is derived from the phase and amplitude of the detected signals. The detected signals are processed by a downhole circuit or processor that is may be placed in a housing 170 above the mud motor 155 and transmitted to the surface control unit 140 using a suitable telemetry system 172. In addition to or instead of the propagation resistivity device, a suitable induction logging device may be used to measure formation resistivity.

The inclinometer 174 and gamma ray device 176 are suitably placed along the resistivity measuring device 164 for respectively determining the inclination of the portion of the drill string near the drill bit 150 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 155 transfers power to the drill bit 150 via one or more hollow shafts that run through the resistivity measuring device 164. The hollow shaft enables the drilling fluid to pass from the mud motor 155 to the drill bit 150. In an alternate embodiment of the drill string 120, the mud motor 155 may be coupled below resistivity measuring device 164 or at any other suitable place.

The drill string contains a modular sensor assembly, a motor assembly and kick-off subs. In one embodiment, the sensor assembly includes a resistivity device, gamma ray device and inclinometer, all of which are in a common housing between the drill bit and the mud motor. The downhole assembly of the present invention preferably includes a MWD section 168 which contains a nuclear formation porosity measuring device, a nuclear density device, an acoustic sensor system placed, and a formation testing system above the mud motor 164 in the housing 178 for providing information useful for evaluating and testing subsurface formations along borehole 126. A downhole processor may be used for processing the data.

Figure 2:
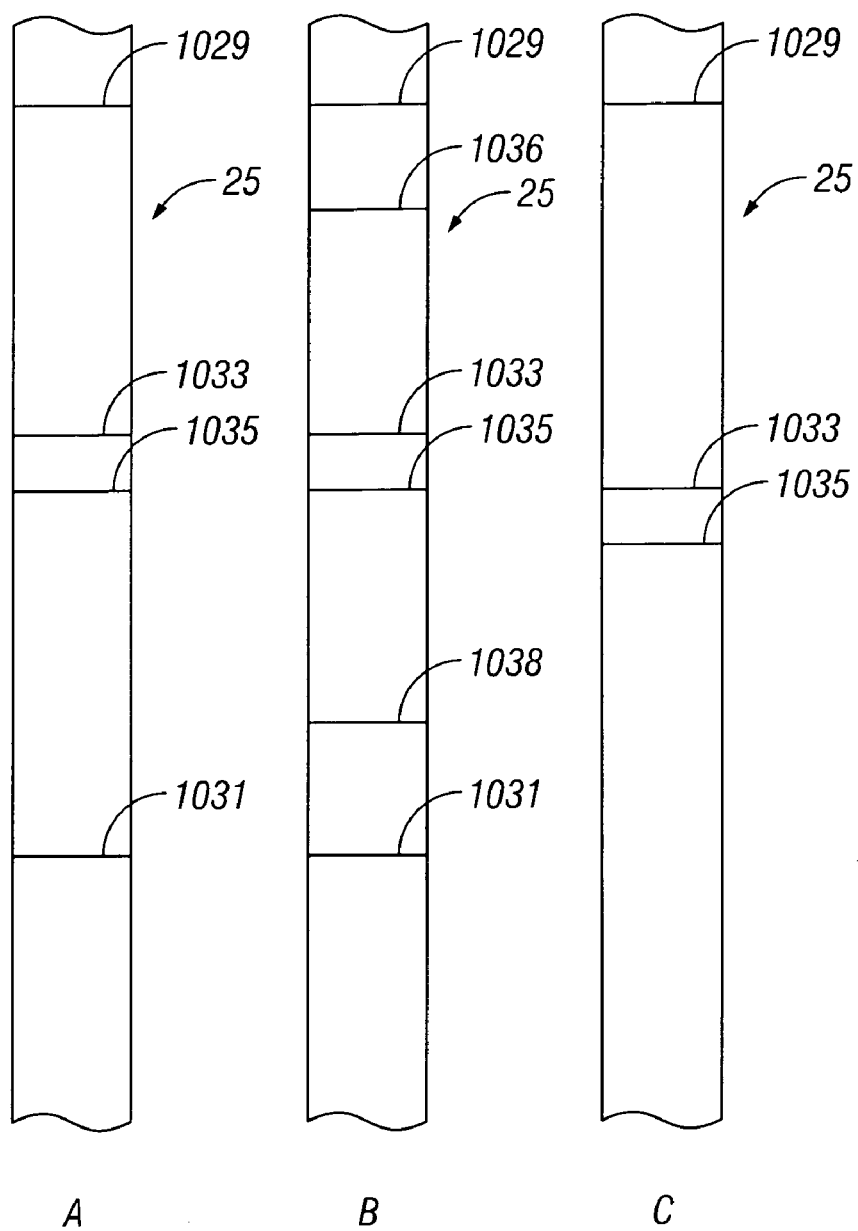
FIGS. 2a, 2b, and 2c (prior art) provide schematic views of possible antenna configurations.

FIGS. 2a, 2b, and 2c depict in simplified schematic form several possible antenna configurations which can be utilized in accordance with the teachings of the present invention. The antenna configuration of FIG. 2a is a dual transmitter, dual receiver antenna configuration which includes upper transmitting antenna 1029 located at an upper portion of measurement tubular 25, lower transmitting antenna 1031, which is located at a lower portion of measurement tubular 25, and intermediate receiving antennas 1033, 1035. FIG. 2b depicts another antenna configuration and includes upper transmitting antennas 1029, 1036 which are located at an upper portion of measurement tubular 25, lower transmitting antennas 1031, 1038 which are located at a lower portion of measurement tubular 25, and intermediate receiving antennas 1033, 1035. Yet another configuration which is possible in accordance with the present invention is depicted in FIG. 2c. This configuration includes only a single transmitting antenna, such as upper transmitting antenna 1029, and two or more receiving antennas 1033, 1035. It should be noted that the illustrations in FIGS. 2a-2c are for exemplary purposes, illustrative of propagation resistivity tools, and not to be construed as a limitation to the invention.

Figure 3:
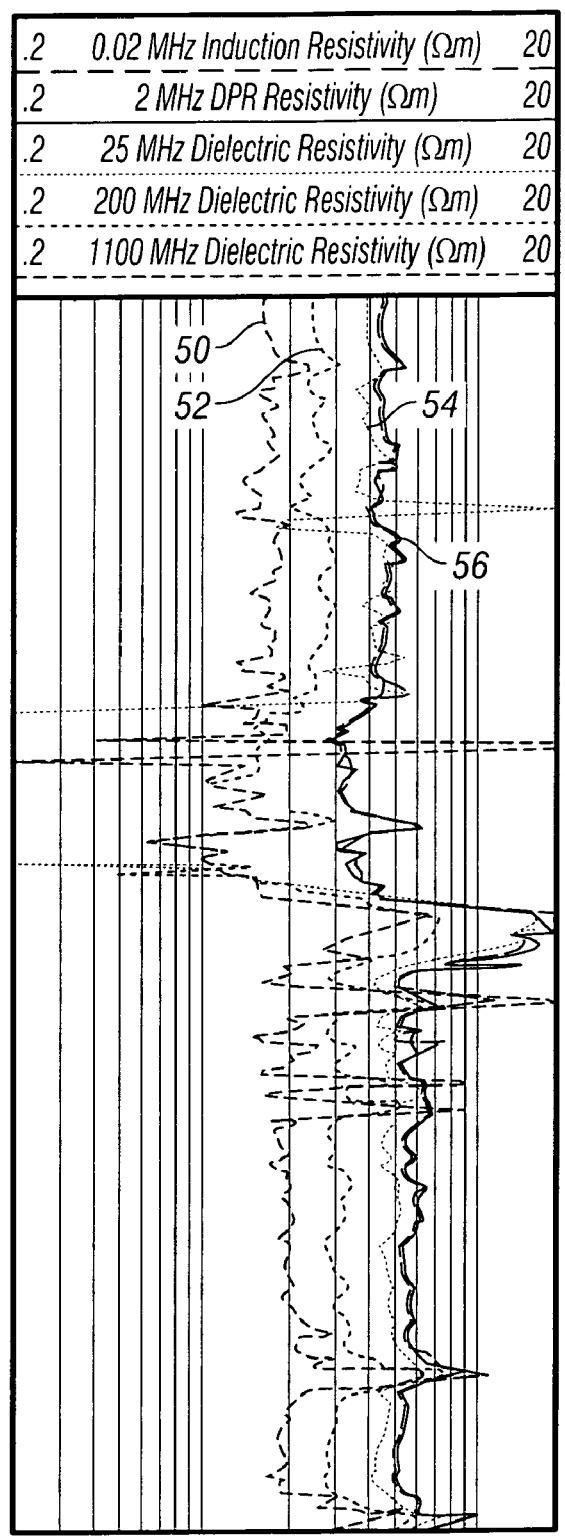
FIG. 3 (prior art) shows apparent resistivity measured at four different transmitter frequencies and recorded as a function of depth within a well borehole.
Figure 4:
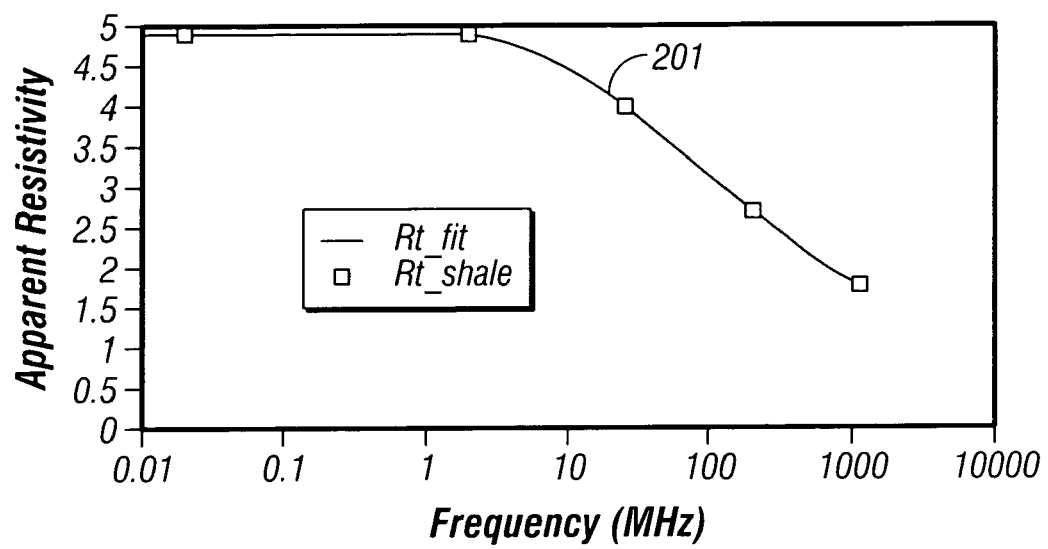
FIG. 4 (prior art) shows apparent resistivity measurements at a depth of 2028 ft (617 m) for the data of FIG. 3.

Turning now to FIG. 3, resistivity measurements made at five different frequencies in a borehole are shown. The measurement frequencies are 20 kHz and 2 MHz (56), 25 MHz (54), 200 MHz (52) and 1.1 GHz (50) respectively. These curves show that the resistivity decreases as the frequency increases. FIG. 4 contains a plot of field data from a shale in a Ponca City test well at five different frequencies from 20 kHz to 1.1 GHz at a single depth. The frequency variation can be explained in part by the concept of electrical efficiency.

At low frequency (about 5 MHz or less) an ion must traverse the smallest pore throats while at high frequency (roughly 1 GHz or higher) the ion scarcely moves and therefore is not required to go through the complicated geometry of the pore system. This means that a maximum conductivity is achieved at high frequency. This also corresponds to the maximum electrical efficiency which is 1.0 by definition. Electrical efficiency is equivalent to Archie's equation and is more physically based. Therefore, it is possible to determine the same things as Archie's equation with known parameters if the electrical efficiency can be determined. The electrical efficiency is merely the low frequency conductivity divided by the high frequency limit. While it is difficult to measure the resistivity at the high frequency limit using a MWD tool, it is possible to get an asymptotic value of a curve such as 201. The asymptotic value may be obtained, for example, by fitting an exponential to the tail end of the curve. Other curve fitting techniques may be used. For example, a sigmoidal curve fitting uses an approximation of the form $$y = A_0 - \frac{A_0 - A_t}{1 + e^{(x-x_0)/w}}. \quad (1)$$

Such a curve fitting has four parameters and given five or more resistivity measurements, the asymptotic value $A_t$ can be determined. Such curve fitting can be used for both conductivity and its reciprocal, the resistivity. Conductivity and resistivity are examples of properties referred to as resistivity properties.

The frequency-dependence of the conductivity has information about the geometry of the pore system and may aid in an estimation of permeability. This invention preferably makes measurements while drilling because wireline tools would be affected by invasion. This would cause the high frequency data to be uninterpretable making it impossible to calculate the electrical efficiency.

In one embodiment of the invention, the electrical efficiency as measured by a resistivity tool (discussed above) is interpreted in terms of a pore scale geometric model. The starting point is the principle that the conductivity of a rock sample depends on two quantities. One is the total amount of conductive fluid (water) in the pores, and the other is the geometry of the water in the pores. This is illustrated in FIGS. 5a-5d.

Figure 5A:
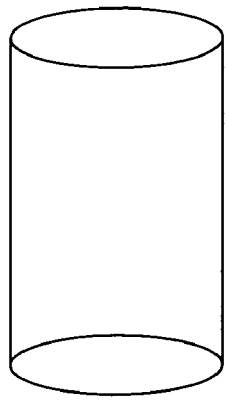
FIGS. 5a-5d illustrate the concept of electrical efficiency.
Figure 5B:
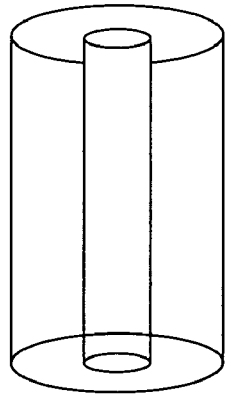
Figure 5C:
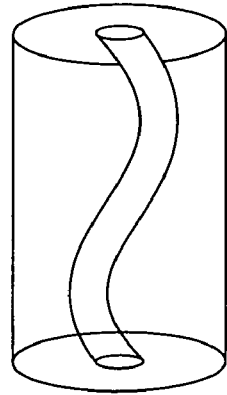
Figure 5D:
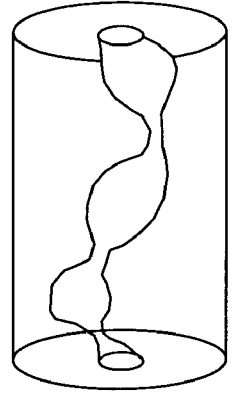

In FIG. 5a, the cylinder represents a cylinder of unit cross-sectional area. When the cylinder is filled with a fluid of conductivity $C_w$, a conductivity measurement between the ends of the cylinder would give a value of $C_w$. FIG. 5b denotes a thick walled cylinder of rock with an effective porosity of $\phi$ denoted by the continuous inner cylinder. When the pore space is filled with a fluid of conductivity $C_w$ the measured conductivity of the cylinder becomes $C_w\phi$. FIG. 5c shows a case where the pore space is not a straight cylinder, and the resulting conductivity is given by $$C_w \phi \frac{1}{\tau^2}$$

where the term $$\frac{1}{\tau^2}$$

is a geometric factor. For the general case shown in FIG. 5d, the conductivity may be denoted as $C_w\phi E_0$. The term $E_0$ is termed the electrical efficiency. Thus, effect of the geometry of a randomly shaped tube can be accounted for by a generic geometric variable $E_0$. Note that this approach separates the effects of pore volume and pore geometry.

Figure 6:
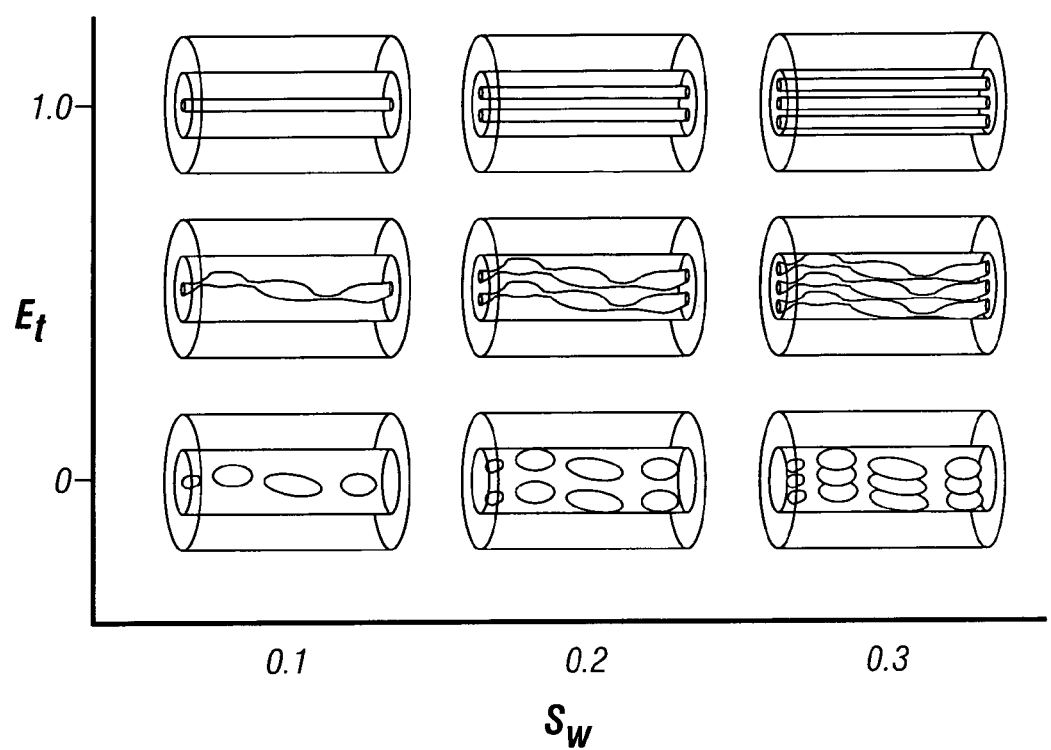
FIG. 6 illustrates the effect of fluid saturation on efficiency.
Figure 7A:
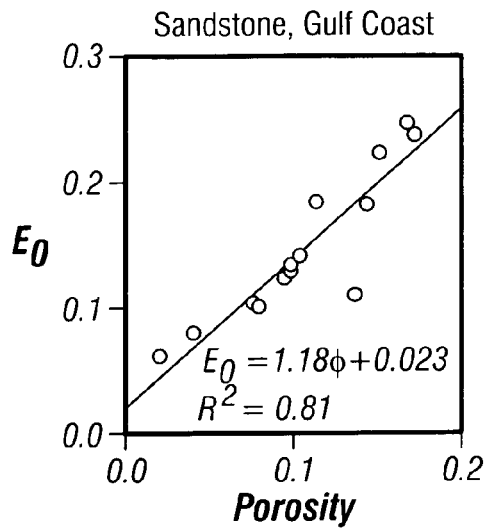
FIGS. 7a-7d (prior art) illustrate the correlation between efficiency and porosity for several different rocks.
Figure 7B:
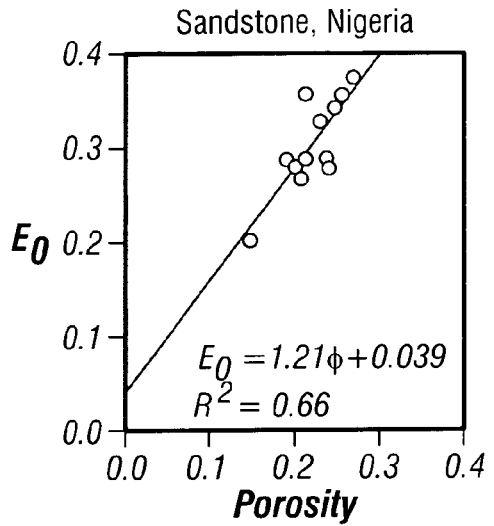
Figure 7C:
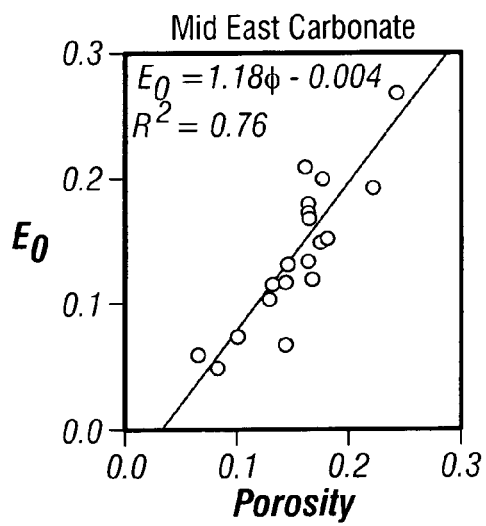
Figure 7D:
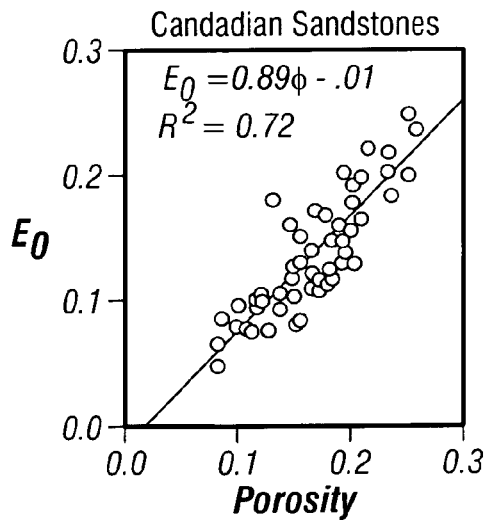

Another factor which effects the efficiency is the fluid saturation of the pore space. This is shown in FIG. 6 where within each column, the saturation of the conductive fluid is constant. Within each row, the geometric factor relating to the fluid distribution is the same. The measured conductivity is then given by the relation:

$$C_t = C_w S_w \phi E_t \quad (2).$$

The inherent independence of the electrical efficiency and the water content is useful since geometric effects can be considered separately from volumetric effects. For example, the relationship between the electrical efficiency and porosity for water-saturated rocks can be used to classify them in terms of their electrical properties, or conversely, to use $E_0$ and $\phi$ to determine the type of pore-system in a rock.

Although no inherent relationship exists between electrical efficiency (or pore geometry) and water content, the depositional, compactional and diagenetic processes that change porosity simultaneously affect pore geometry. Any process that simultaneously affects the pore-throat sizes and the pore volume can produce an E-$\phi$ correlation. Hence, similar rocks that experience similar diagenetic events, should exhibit some type of E-$\phi$ correlation. To explore the nature of E-$\phi$ relationships, electrical and porosity measurements have been evaluated for several suites of rock samples. The relationship for three sandstones and one carbonate are shown in FIGS. 7a-7d. In each case, the relationship is linear, $$E_0 = a_0 \phi + b_0 \quad (3),$$

where $a_0$ an and $b_o$ are the slope and intercept respectively, and the 0 subscript indicates the value of E when the rock sample is completely water saturated. Generally, clean rocks having intergranular porosity have a linear $E_0$-$\phi$ relationship, with electrical efficiency increasing with porosity. The scatter of individual sample points about the line may be due to the variability in composition and local diagenetic environment that would be expected in any sedimentary rock column. The relationship describes the relative effect of compactional and diagenetic processes on the pores ($\phi$) and pore throats (E). The observed trends are linear for clay-free rocks with intergranular porosity.

Figure 8:
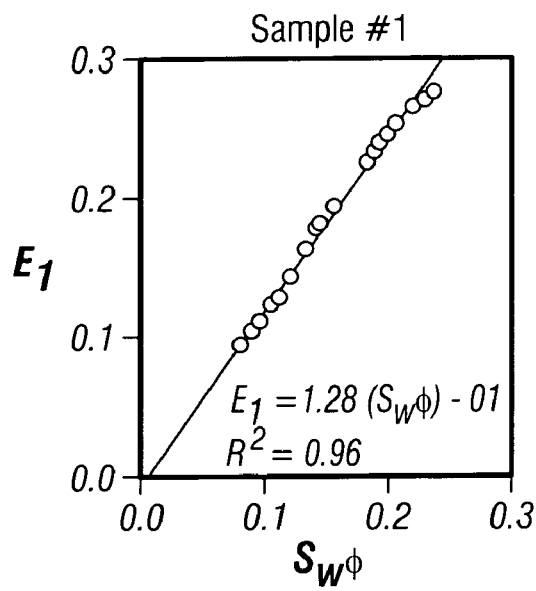
FIG. 8 (prior art) shows an example of the variation of efficiency with water saturation.

In addition to changing the porosity from one sample to the next, brine content of a given sample can be varied by decreasing the water saturation with nonconductive hydrocarbons. FIG. 8 shows the electrical efficiency-water content relationships for a sample rock. A linear relationship is remarkably well determined. The small deviations from the linear relationships are likely to be experimental errors. The indication is that the electrical efficiency-water content relationship is linear for clean rocks having predominantly intergranular porosity and can be expressed as $$E_t = a_t S_w \phi + b_t \quad (3),$$

in which the subscript t refers to rock samples with partial and varying water saturation and $a_t$ and $b_t$ are the slope and intercept of the linear $E_t$-$S_w\phi$ relationship. Note that both $E_0$ and $E_t$ are both electrical efficiency E. The subscripts only indicate the mechanism whereby the water content of the rock is varied; i.e., $E_0$ varies with $\phi$, and $E_t$ varies with $S_w$.

Figure 9:
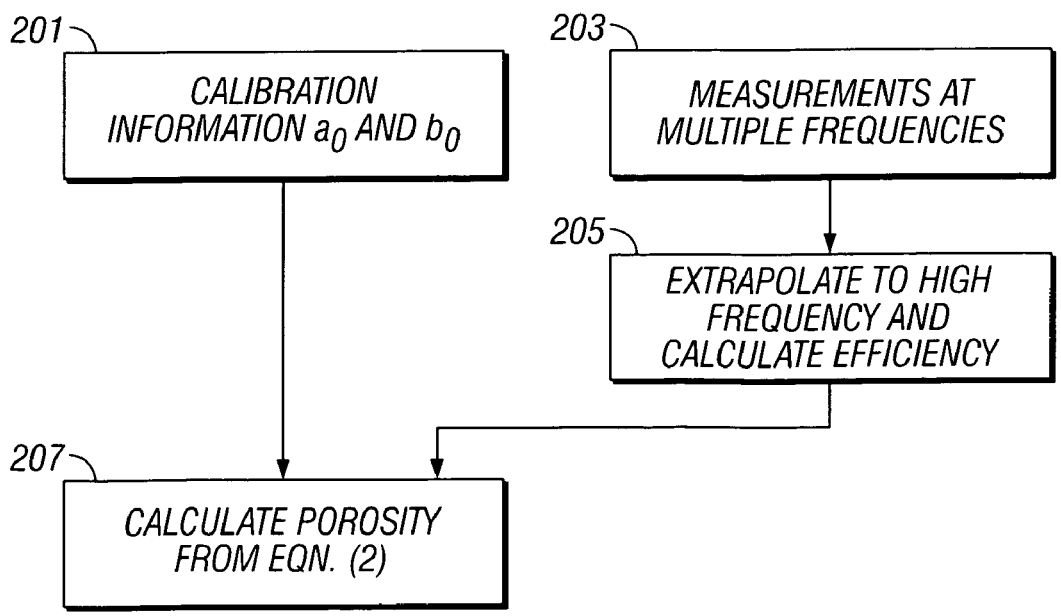
FIGS. 9-11 show flow charts of exemplary embodiments of the present invention.

Turning now to FIG. 9, a flow chart of one embodiment of the invention is shown. Resistivity measurements are made at a plurality of frequencies 203. These measurements are extrapolated 205 to high frequencies using a curve-fitting technique, and the asymptotic high frequency resistivity (and conductivity) are determined. It should be noted that the curve fitting could be done either for resistivity or its reciprocal, the conductivity. From the extrapolated value, the electrical efficiency is estimated. From a practical standpoint, it is usually sufficient to estimate a resistivity (or conductivity) at a frequency greater than about 10 GHz. Analysis of the data is based on previously established empirical relationships 201 (calibration relation) of the form given by eqn. (2). Thus, given an estimate of the efficiency, the porosity of the rock can be determined 207.

Figure 10:
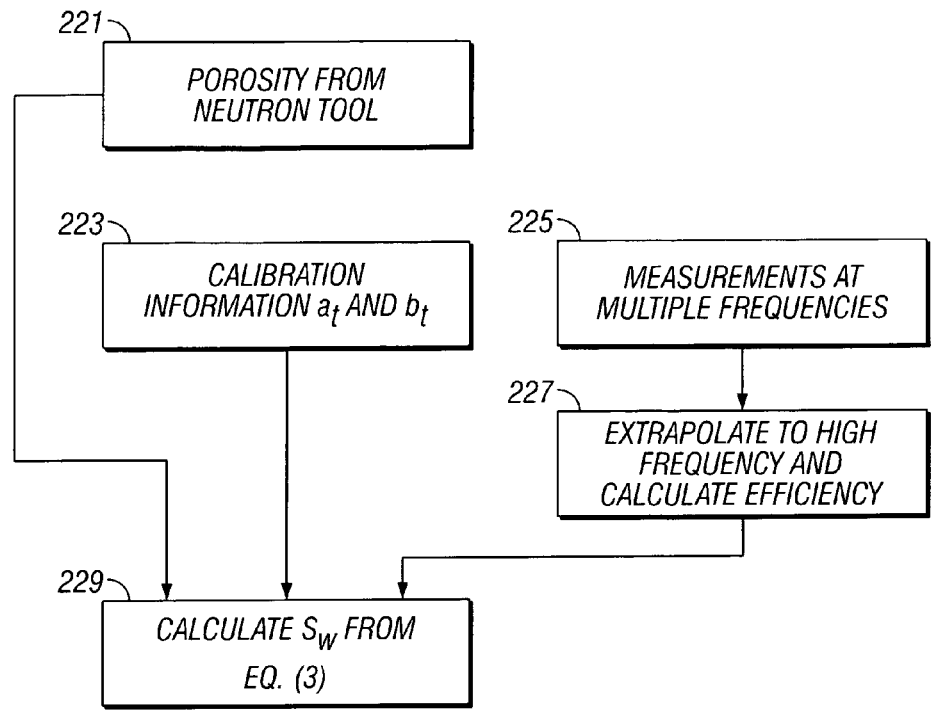
Figure 11:
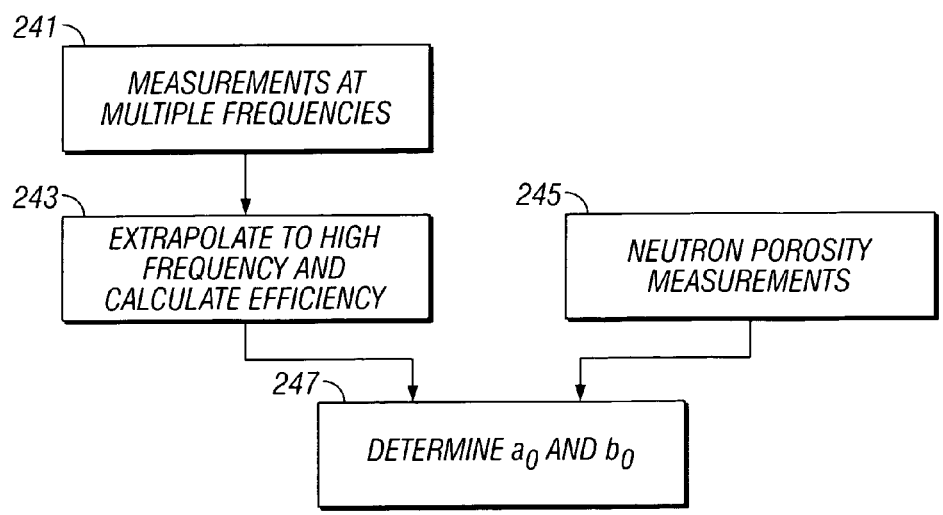

Another embodiment of the invention is illustrated in FIG. 10. Resistivity measurements are made at multiple frequencies 225 and by extrapolating to high frequencies, the electrical efficiency is estimated 227. Calibration information 223 is obtained, this time of the form given by eqn. (3). A porosity tool, such as a neutron porosity tool, on the BHA is used to measure the formation porosity 221. Using the calibration relation and the measured porosity, by using eqn. (3) the water saturation can be estimated 229. The porosity estimated using the method of FIG. 9 and the water saturation estimated using the method of FIG. 10 are examples of petrophysical properties related to the rock pores and the fluid distribution therein. The method outlined in FIG. 9 is a special case of the method of FIG. 10 with $S_w$=1.

Yet another embodiment of the invention is used for establishing calibration relations of the form given by eqn. (2). Resistivity measurements are made at a plurality of frequencies 241. These are extrapolated to high frequency and the electrical efficiency determined 243. A porosity tool such as a neutron porosity tool is used to provide porosity measurements corresponding to the depths where the resistivity measurements are made 245. Using the efficiency and porosity measurements, the calibration constants $a_0$ and $b_0$ are estimated.

Those versed in the art and having benefit of the present disclosure would recognize that the empirical relations given by eqns. (2) and (3) are, at the very least, lithology-specific.

The estimated electrical efficiency and/or formation porosity may be output on a suitable medium. They may further be used for making operational decisions relating to reservoir development including but not limited to placement of additional wells, design of casing and completion strings.

The operation of the transmitters and receivers, and the control of the drilling direction may be controlled by the downhole processor and/or a surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks. The term "processor" as used herein is intended to include Field Programmable Gate Arrays (FPGAs).

While the foregoing disclosure is directed to the preferred embodiments of the invention, various modifications will be apparent to those skilled in the art. It is intended that all such variations within the scope of the appended claims be embraced by the foregoing disclosure.

What is claimed is:

1. A method of evaluating an earth formation, the method comprising:
    making measurements indicative of a resistivity property of the earth formation at each of a plurality of frequencies;
    estimating from the measurements a value of the resistivity property at a frequency greater than 10 GHz; and
    using the estimated value of the resistivity property for estimating a petrophysical property of the earth formation, the petrophysical property that is related to rock pores and a fluid distribution therein.

2. The method of claim 1 wherein the estimated petrophysical property further comprises a porosity of the earth formation.

3. The method of claim 1 wherein the estimated petrophysical property further comprises a fluid saturation of the earth formation.

4. The method of claim 1 wherein estimating the value of the resistivity property at the frequency greater than 10 GHz further comprises using a curve fitting.

5. The method of claim 4 wherein the curve fitting further comprises a sigmoidal curve fitting.

6. The method of claim 1 wherein estimating the petrophysical property further comprises estimating an electrical efficiency of the formation.

7. The method of claim 6 wherein estimating the petrophysical property further comprises using an empirical relation between the petrophysical property and the electrical efficiency.

8. The method of claim 1 wherein making the measurements indicative of the resistivity property further comprises using a propagation resistivity tool in a borehole in the earth formation.

9. The method of claim 8 wherein making the measurements indicative of the resistivity property further comprises conveying the propagation resistivity tool on a bottomhole assembly using a drilling tubular.

10. An apparatus for evaluating an earth formation, the apparatus comprising:
a resistivity logging tool configured to make measurements indicative of a resistivity property of the earth formation at each of a plurality of frequencies; and
a processor configured to:
estimate from the measurements a value of the resistivity property at a frequency greater than 10 GHz; and
use the estimated value of the resistivity property to estimate a petrophysical property of the earth formation, the petrophysical property that is related to rock pores and a fluid distribution therein.

11. The apparatus of claim 10 wherein the petrophysical property estimated by the processor further comprises a porosity of the earth formation.

12. The apparatus of claim 10 wherein the petrophysical property estimated by the processor further comprises a fluid saturation of the earth formation.

13. The apparatus of claim 10 wherein the processor is further configured to perform a curve fitting to estimate the value of the resistivity property at the frequency greater than 10 GHz.

14. The apparatus of claim 13 wherein the processor performs the curve fitting by further performing a sigmoidal curve fitting.

15. The apparatus of claim 10 wherein the processor is further configured to estimate the petrophysical property by estimating an electrical efficiency of the formation.

16. The apparatus of claim 15 wherein the processor is further configured to estimate the petrophysical property by using an empirical relation between the petrophysical property and the electrical efficiency.

17. The apparatus of claim 10 wherein the resistivity logging tool further comprises a propagation resistivity tool in a borehole in the earth formation.

18. The apparatus of claim 10 further comprising a drilling tubular configured to convey the resistivity logging tool on a bottomhole assembly using a drilling tubular.

19. A computer-readable medium for use with an apparatus for evaluating an earth formation, the apparatus comprising:
a resistivity logging tool configured to make measurements indicative of a resistivity property of the earth formation at a plurality of frequencies;
the medium comprising instructions which enable a processor to:
estimate from the plurality of measurements a value of the resistivity property at a frequency greater than 10 GHz; and
use the estimated value of the resistivity property to estimate a petrophysical property of the earth formation, the petrophysical property that is related to rock pores and a fluid distribution therein.

20. The medium of claim 19 further comprising at least one of (i) a ROM, (ii) an EPROM, (iii) an EAROM, (iv) a flash memory, and (v) an optical disk.

\* \* \* \* \*